(12) United States Patent
Pennisi

(10) Patent No.: US 12,008,911 B2
(45) Date of Patent: Jun. 11, 2024

(54) METHOD OF DISTRIBUTION AND/OR UPDATE OF A NO FLY ZONES DATABASE FOR UAV VEHICLES, AND VEHICLE THEREOF

(71) Applicant: PATMOS, UNIPESSOAL LDA, Funchal (PT)

(72) Inventor: Dario Pennisi, Loc. Aranova (IT)

(73) Assignee: Patmos, Unipessoal LDA, Funchal (PT)

( * ) Notice: Subject to any disclaimer, the term of this patent is extended or adjusted under 35 U.S.C. 154(b) by 614 days.

(21) Appl. No.: 16/649,932

(22) PCT Filed: Sep. 21, 2018

(86) PCT No.: PCT/IB2018/057300
§ 371 (c)(1),
(2) Date: Mar. 23, 2020

(87) PCT Pub. No.: WO2019/058319
PCT Pub. Date: Mar. 28, 2019

(65) Prior Publication Data
US 2020/0226933 A1  Jul. 16, 2020

(30) Foreign Application Priority Data

Sep. 25, 2017 (IT) .......................... 102017000107065

(51) Int. Cl.
*G08G 5/00* (2006.01)
*B64C 39/02* (2023.01)
*G01S 19/05* (2010.01)

(52) U.S. Cl.
CPC ........... *G08G 5/006* (2013.01); *B64C 39/024* (2013.01); *G01S 19/05* (2013.01); *B64U 2201/10* (2023.01)

(58) Field of Classification Search
CPC .................. G08G 5/006; B64C 39/024; B64C 2201/141; G01S 19/05
See application file for complete search history.

(56) References Cited

U.S. PATENT DOCUMENTS

| 9,031,725 B1* | 5/2015 | DiEsposti | G01S 19/11 701/22 |
| 9,412,278 B1* | 8/2016 | Gong | G08G 5/0039 701/2 |
| 2016/0275801 A1 | 9/2016 | Kopardekar | |
| 2017/0169713 A1 | 6/2017 | Gong et al. | |
| 2019/0317530 A1* | 10/2019 | Yang | G08G 5/0013 |

OTHER PUBLICATIONS

International Search Report dated Nov. 15, 2018, issued in PCT Application No. PCT/IB2018/057300, filed Sep. 21, 2018.
Written Opinion dated Nov. 15, 2018, issued in PCT Application No. PCT/IB2018/057300, filed Sep. 21, 2018.

* cited by examiner

*Primary Examiner* — Peter D Nolan
*Assistant Examiner* — Jacob Kent Besteman-Street
(74) *Attorney, Agent, or Firm* — Workman Nydegger

(57) ABSTRACT

Method of distribution and/or update of a No Fly Zones database stored aboard UAV vehicles. The distribution and/or update utilize the satellite infrastructure and the receivers installed aboard said UAV vehicles in order to establish a one-way communication channel that allows the NFZ database, or a portion thereof, to be periodically sent to the UAV vehicles.

17 Claims, 3 Drawing Sheets

METHOD OF DISTRIBUTION AND/OR UPDATE OF A NO FLY ZONES DATABASE FOR UAV VEHICLES, AND VEHICLE THEREOF

FIELD OF THE INVENTION

The present invention relates to a method of distribution and/or update of a No Fly Zones database, in particular for UAVs (Unmanned Aerial Vehicles).

DESCRIPTION OF THE BACKGROUND ART

The constantly growing use of Drones or UAVs (Unmanned Aerial Vehicles) has led to increased concern about the safety of manned flights (e.g. commercial aviation) and of the population on the ground, as well as about the security of military or sensible areas. For this reason, the most important national airspace regulatory agencies are adopting legislative measures for limiting flights over critical areas by defining No Fly Zones (NFZ), i.e. flight interdiction zones for UAVs and drones.

The methods of identification and application of No Fly Zones are not yet homogeneous worldwide, even though they share a common approach by identifying airport and urban areas as interdicted zones.

At the time of writing of this document, civil aviation authorities throughout the world are maintaining and publishing specific databases for No Fly Zones, but actual observance of such regulations is dependent on the free will of UAV pilots or, in some cases, of individual manufacturers. In the latter case, UAV manufacturers are beginning to make their own flight controllers capable of refusing to fly towards No Fly Zones.

The diffusion of UAVs for recreational, civil and professional use is rapidly increasing, and the necessity of automating the access to the No Fly Zones database and to implement the necessary countermeasures directly in the UAV vehicles is becoming more and more impelling.

Nowadays, all UAV vehicles are equipped with a flight controller that transforms high-level flight instructions into commands for the motors, taking into account measurements taken by sensors such as gyroscopes, accelerometers, altimeters and, of course, GNSS geolocation systems.

The acronym GNSS refers to a global navigation satellite system based on terrestrial, maritime or aerial geo-radiolocation and navigation systems, which utilize a network of artificial satellites in orbit and pseudolites.

Currently, the most common GNSS navigation systems are GPS (USA), Galileo (Europe) and GLONASS (Russia).

Some of the most important UAV manufacturers have equipped their latest-generation flight controllers with automatic controls that ensure NFZ compliance, de facto inhibiting pilot control in the event of a violation.

The flight controller accesses a local geographic database containing the NFZ list. This database is updated via an Internet connection, often through smartphone devices and suitable apps that are used for configuring the UAV and receiving various updates.

For example, company DJI, which is the biggest manufacturer of semi-professional UAVs in the world, is currently keeping up-to-date a database of approx. 8,000 NFZs.

However, for obvious reasons, it is not conceivable to entrust the responsibility for managing such databases to the individual companies.

In this way, moreover, NFZ application could even be gotten around by means of techniques such as GNSS jamming/spoofing or by modifying the smartphone app.

A symmetrical approach would require equipping all UAVs with a respective transponder univocally identifying them and allowing the monitoring systems on the ground to keep watch on the airspace.

Besides being ineffective should an ill-intentioned person remove the transponder, this solution would also require the deployment of a huge monitoring network all over the territory, and anyway would not contribute to preventing flight in forbidden areas.

Finally, ground-based systems are currently being developed which consist of a set of radars and radio interception systems monitoring the airspace and the electromagnetic spectrum in an attempt to intercept the presence of the UAV vehicle itself or of the radio control channel that is piloting it.

So far, this approach has turned out to be difficult to handle, in that the cross-section of the most common UAV vehicles is typically similar to that of the biggest birds, and their communication protocols are very variegated and in some cases encrypted, and thus difficult to identify.

OBJECT AND SUMMARY

It is therefore the object of the present invention to overcome the problems of the above-described solutions.

In particular, this object is achieved through a method of distribution and/or update of a No Fly Zones database for UAV vehicles (Unmanned Aerial Vehicles) according to claim 1.

In particular, this method provides distribution and/or update through the use of the satellite infrastructure and receivers aboard the UAV vehicles, so as to establish a one-way communication channel that allows the NFZ database, or a portion thereof, to be periodically sent to the UAV vehicles.

In several embodiments, the satellite infrastructure comprises GNSS satellites, the UAV vehicles comprise GNSS receivers, and the communication channel utilizes the GNSS satellite infrastructure to send the NFZ database, or a portion thereof, to the UAV vehicles.

In several embodiments, the communication channel is established by entering the data in the protocol used for the positioning data of the GNSS satellite infrastructure in order to send the NFZ database, or a portion thereof, to the UAV vehicles.

As an alternative, the communication channel utilizes the dedicated data channels of the GNSS satellite infrastructure in order to send the NFZ database, or a portion thereof, to the UAV vehicles.

In several embodiments, the satellite infrastructure comprises SBAS satellites, the UAV vehicles comprise SBAS receivers, and the communication channel utilizes the SBAS satellite infrastructure to send the NFZ database, or a portion thereof, to the UAV vehicles.

In particular, the communication channel is established by entering the data in the protocol used for the positioning data of the SBAS satellite infrastructure in order to send the NFZ database, or a portion thereof, to the UAV vehicles.

As an alternative, the communication channel utilizes a reserved channel of the SBAS satellite infrastructure in order to send the NFZ database, or a portion thereof, to the UAV vehicles.

In several embodiments, the satellite infrastructure comprises telecommunications satellites, the UAV vehicles comprise telecommunications receivers, and the communication channel utilizes the satellite infrastructure to send the NFZ database, or a portion thereof, to the UAV vehicles.

In particular, the communication channel utilizes the L band of the channels of the satellite telecommunications infrastructure in order to send the NFZ database, or a portion thereof, to the UAV vehicles.

In several embodiments, the GNSS satellite infrastructure is complemented with a satellite communication system that comprises SBAS satellites, wherein the signals of the satellites of the SBAS system use a reserved identifier SV ID not used by the satellites of the GNSS satellite infrastructure that transmit geolocation data, in order to send the NFZ database, or a portion thereof, to the UAV vehicles.

In alternative embodiments, the GNSS satellite infrastructure is complemented with a satellite communications system that comprises one or more telecommunications satellites transmitting in accordance with a protocol which complies with the physical layer of GNSS infrastructures, and which can therefore be demodulated by GNSS receivers aboard said UAV vehicles, wherein the telecommunications satellites are used in order to send the NFZ database, or a portion thereof, to the UAV vehicles by exploiting all the available channel.

Otherwise, the GNSS satellite infrastructure is complemented with a satellite communications system that comprises one or more telecommunications satellites transmitting in accordance with a protocol which complies with the physical layer of GNSS infrastructures, and which can therefore be demodulated by GNSS receivers aboard the UAV vehicles, wherein the telecommunications satellites are used in order to send the NFZ database, or a portion thereof, to the UAV vehicles by sharing the channel with other data.

In several embodiments, the NFZ database is subject to incremental updates based on hash methods that provide, in parallel with the slow transmission of the complete NFZ database, and with a higher frequency, the sending of packets only concerning the differences between previous versions of the NFZ database and the current one, wherein the hash methods are used in order to validate the consistency of the information.

In several embodiments, the NFZ database is divided into regions compatible with the coverage provided by satellite communications systems, and the regions may in turn be divided into sub-regions in order to break up the transport into smaller blocks of the entire region.

More in detail, the satellite communications system comprises SBAS satellites and/or telecommunications satellites.

In several embodiments, the receivers aboard the UAV vehicles receive and manage only that portion of the database which covers those NFZs that are present in the area where the UAV vehicles are located.

In several embodiments, the information in the NFZ database is stored in such a way that all coordinates are expressed as relative distances from a point of origin, and wherein the point of origin is not fixed throughout the database, but may vary depending on which sub-region the coordinates belong to.

In particular, the information in the NFZ database is stored in such a way that each NFZ area is identified as a single point and a radius, thus determining a circular area.

As an alternative, each NFZ area stored in the NFZ database is identified as an aggregation of circular areas, or spline areas, or as a polygon, wherein the first point is determined as coordinates relative to the sub-region and the next points are determined as coordinates relative to the point of origin.

In several embodiments, the data of the NFZ database are encrypted by means of a public key.

BRIEF DESCRIPTION OF THE DRAWINGS

Further advantages, objects, features and embodiments of the present invention are set out in the claims and will become apparent in light of the following detailed description with reference to the drawings, wherein identical or equivalent parts are identified by the same reference numerals.

DETAILED DESCRIPTION

Figure 1:
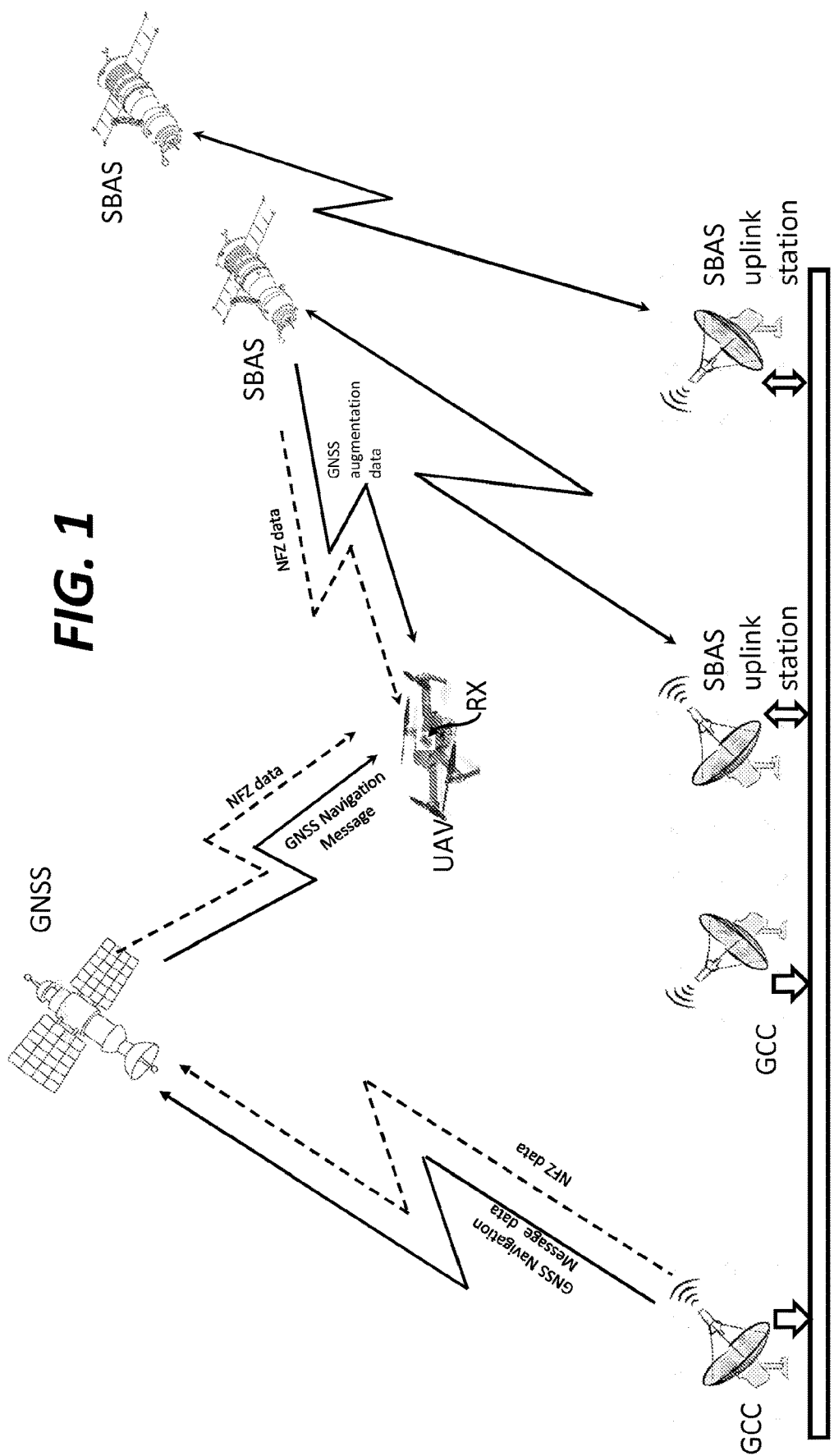
FIGS. 1 and 2 show examples of scenarios of applications of the method according to the present invention.

The following description will illustrate various specific details useful for a deep understanding of some examples of one or more embodiments. The embodiments may be implemented without one or more of such specific details or with other methods, components, materials, etc. In other cases, some known structures, materials or operations will not be shown or described in detail in order to avoid overshadowing various aspects of the embodiments. Any reference to "an embodiment" in this description will indicate that a particular configuration, structure or feature is comprised in at least one embodiment. Therefore, the phrase "in an embodiment" and other similar phrases, which may be present in different parts of this description, will not necessarily be all related to the same embodiment. Furthermore, any particular configuration, structure or feature may be combined in one or more embodiments as deemed appropriate.

The references below are therefore used only for simplicity's sake, and do not limit the protection scope or extension of the various embodiments.

While the present invention will be clarified below by means of a detailed description of some embodiments thereof with reference to the drawings, it must be pointed out that the present invention is not limited to the embodiments described herein and represented in the drawings, since the embodiments described and illustrated herein only exemplify the various aspects of the present invention, the purpose of which is defined in the claims.

The present invention provides a novel method of distribution and update of the NFZ database, and provides implementation thereof directly aboard the UAV vehicle.

This approach exploits the ability of many GNSS geolocation modules already present in UAV vehicles to receive and decode, in addition to the satellites dedicated to geolocation, also signals modulated with the same methods, but transporting packets of a different type.

One example of application of this functionality is the transport of SBAS (Satellite Based Augmentation System) data, which utilizes geostationary satellites transmitting in compliance with the same standard as GPS in order to transport data relating to the corrections that are necessary for achieving better position accuracy and for determining the uncertainty radius.

Some examples of SBAS (Satellite Based Augmentation System) are Omnistar and StarFire, while regional SBASs include WAAS (US), EGNOS (UE), MSAS (Japan) and GAGAN (India).

These systems support extensive regions through the use of messages sent via satellites, and generally consist of ground stations located in accurately determined positions. The ground stations perform the task of collecting the measurements of one or more GNSS satellites. By means of these measurements, corrective messages are created and sent to one or more geostationary satellites and then retransmitted to the users.

Other systems, such as, for example, Galileo, offer dedicated channels natively (Commercial Service) for transmission of generic data to GNSS receivers from the same satellites used for positioning.

The present invention provides, therefore, for utilizing the satellite infrastructure and the existing receivers aboard UAV vehicles in order to establish a one-way communication channel that allows the NFZ database to be periodically sent to UAV vehicles, thus de facto centralizing it and making it accessible anywhere, even where no Internet connectivity is available.

With reference to FIG. 1, the architecture described herein comprises GNSS satellites belonging, for example, to the GPS, Galileo and GLONASS constellations and sending location or positioning signals (GNSS Navigation Message Data).

GNSS systems are dedicated to providing a global-coverage geospatial positioning service that allows suitable electronic receivers RX to determine their own geographic coordinates (longitude, latitude and altitude) anywhere on the terrestrial surface or in the atmosphere with an error of just a few metres, by processing radio-frequency signals being transmitted in line of sight from said satellites.

The L band in which GNSS satellites operate is also suitable for simple reception by receivers RX in motion.

In several embodiments, the receivers RX are in fact prearranged aboard vehicles, in particular UAV vehicles.

The architecture comprises base stations GCC (Ground Control Centres), such as, for example, the Master Control Station (MCS) for GPS or the Galileo Mission System (GMS) for Galileo, which receive signals from GNSS satellites through parabolic antennae.

There are also ground stations (SBAS uplink stations) and SBAS geostationary satellites that collect and process the signals coming from the GNSS satellites.

The SBAS system concept is based on GNSS measurements taken at reference stations accurately positioned and distributed over an entire continent. The GNSS errors calculated by the reference stations are then transferred to a computation centre that computes differential corrections and integrity messages to be then transmitted throughout the continent by means of geostationary satellites as messages added to or superimposed on the original GNSS message. SBAS messages are transmitted by means of geostationary satellites capable of covering extensive areas.

Figure 2:
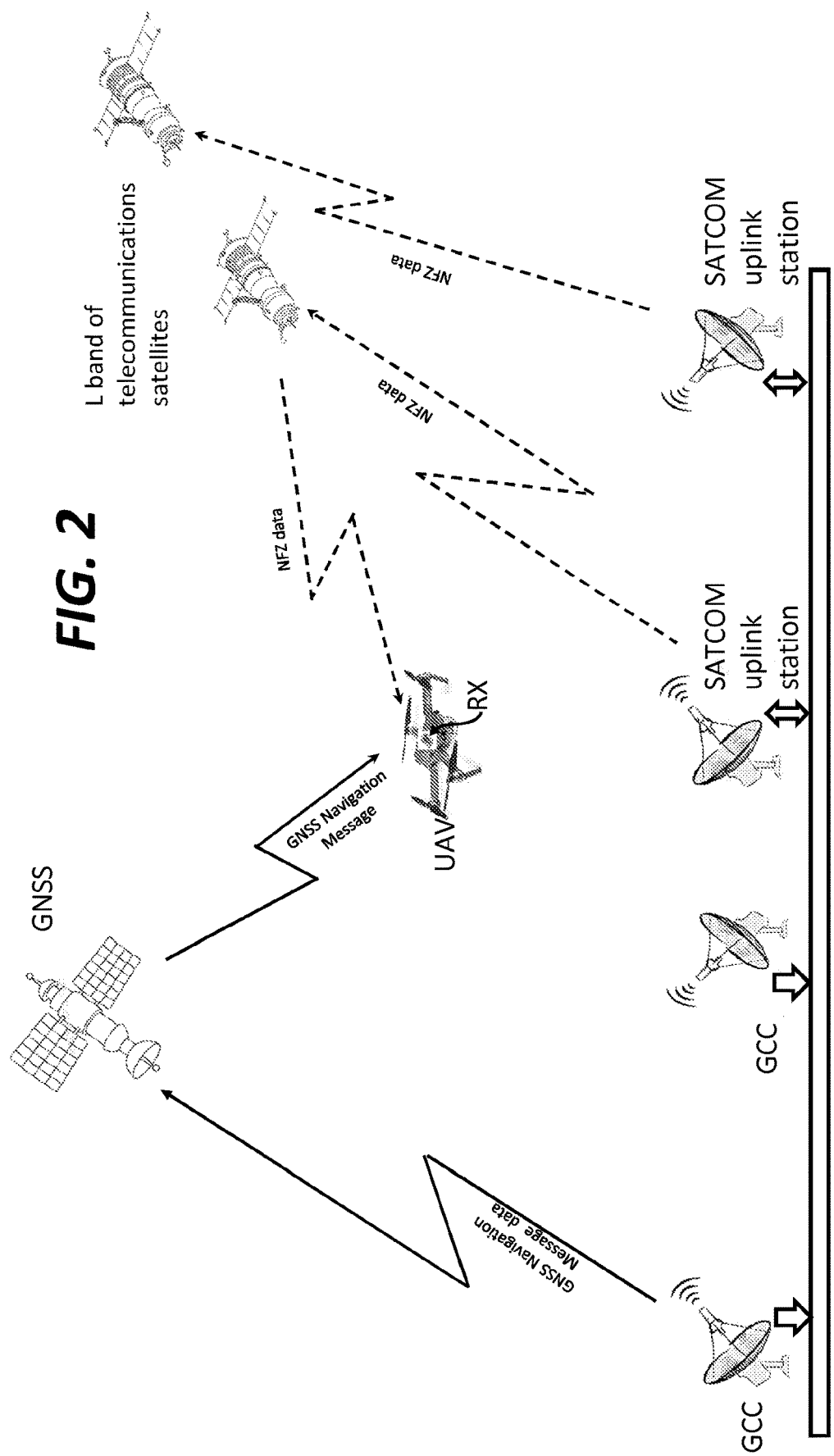

With reference to FIG. 2, there is shown that telecommunications satellites may also be used for sending the NFZ database, in particular by using the L band. In this case, the telecommunications satellites receive data from ground stations (SATCOM uplink station).

The most important feature of this solution is that, by exploiting existing hardware already deployed in the field, it provides a low-cost and easy-to-implement means for creating an NFZ database distribution system, which will only require updating the firmware of the flight controller of the UAV vehicle, or at most replacing the receiver should the existing one not support the reception of generic packets (RAW type), to operate.

Figure 3:
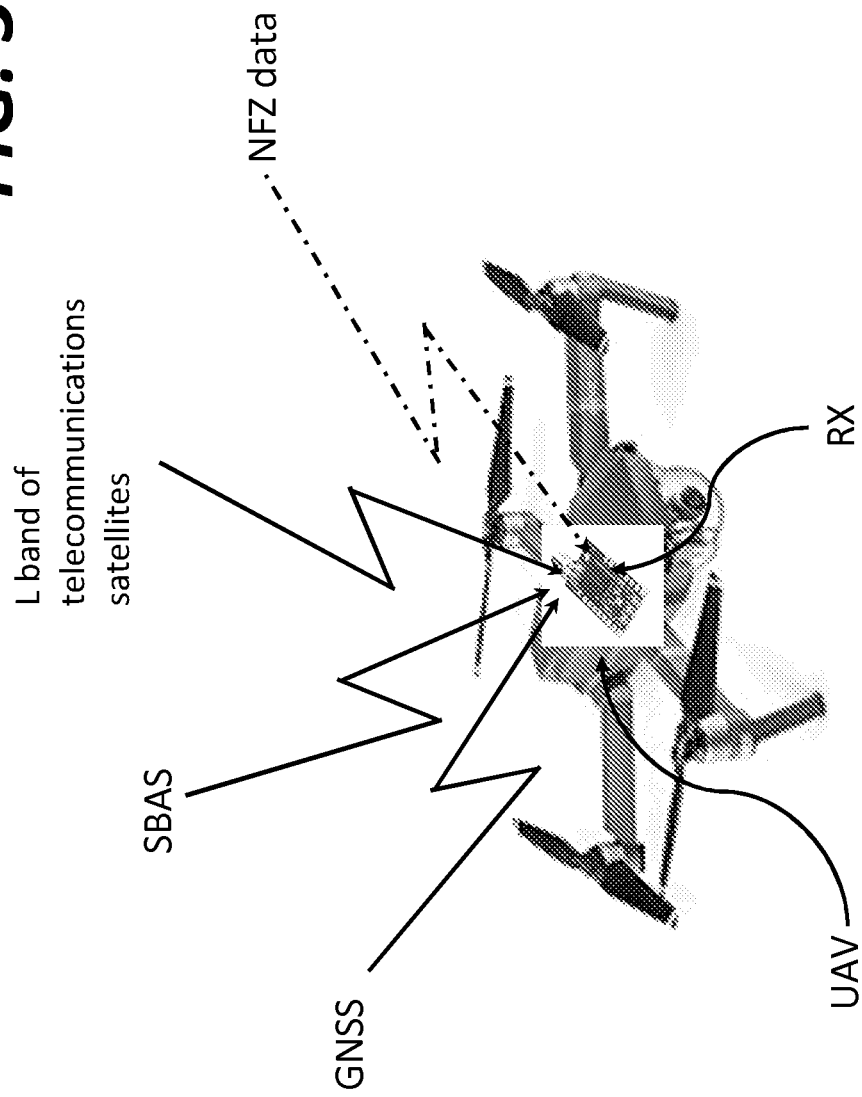
FIG. 3 shows the updated data stream for the UAVs coexisting with the data stream useful for satellite navigation and currently being used by the receivers.

The invention described herein provides for periodically sending the NFZ database through existing satellite channels, e.g. by utilizing satellites already in orbit for emitting the SBAS signals or in the auxiliary data channels of Galileo (in Galileo, the frequencies L1 and L2 are dedicated to civil use), or by exploiting telecommunications satellites. FIG. 3 shows the data stream "NFZ data" for updating the NFZ database for the UAVs coexisting with the data stream useful for satellite navigation and currently being used by receivers. In particular, the receiver RX can receive data from GNSS satellites, from SBAS satellites and/or from telecommunications satellites. The data stream "NFZ data" for updating the NFZ database can be sent via GNSS satellites, SBAS satellites and/or telecommunications satellites.

In the case of SBAS/GPS systems, each satellite sends the data by using a unique identifier (SV ID) associated with a pseudorandom code (PRN) that is orthogonal to that of the other GNSS satellites and necessary for extracting the signal.

In this case, the signals of the SBAS satellites use a reserved SV ID that is recognized by GNSS receivers as a data transmission dedicated to SBAS services (Augmentation services).

Normally, SBAS satellites are generic communications satellites that are also used for, among other functions, transmitting correction information.

There is a broad availability of SV IDs and PRN codes not interfering with existing or planned GNSS signals; this makes it possible to conjecture the use of one or more satellite telecommunications channels in order to distribute update information intended for vehicles, particularly geographic information about NFZs, intended for on-board systems of UAVs.

At any rate, the band transmitted by GNSS systems is rather limited, and ranges from 50 bps (bits per second) of GPS to 500 bps of the Commercial Service of Galileo.

Of course, the GNSS, SBAS and telecommunications satellite systems may be used either in parallel or alternatively.

In the case of a GNSS infrastructure, the NFZ database may be sent through dedicated channels, such as, for example, the data channel provided by Galileo, or the database (or a portion thereof) may be inserted among the other data being transmitted over normal transmission channels.

In the case of an SBAS infrastructure, the NFZ database may be sent by entering the data in the normal SBAS protocol or by using a whole dedicated channel.

In the case of an infrastructure based on telecommunications satellites, it is possible to select the L band for sending the database.

In several embodiments, the GNSS infrastructure is complemented with a satellite communication system that comprises one or more SBAS satellites.

In alternative embodiments, the GNSS infrastructure is complemented with a satellite communication system that comprises one or more telecommunications satellites.

Due to the limited passband of the transmission systems in use for GNSS, it is necessary to optimize the transmission in such a way that the transfer of the whole database, or at least of the section thereof of interest, will occur in the shortest possible time.

For this reason, it is useful to divide the database into regions compatible, for example, with the coverage of SBAS systems, so that UAV vehicles will only have to receive and handle the database of the NFZs in the area where the vehicle is located or is flying.

Further optimization may be achieved by managing incremental updates based on hash methods that provide for sending, in parallel with the slow transmission of the complete database, and with a higher frequency, packets only concerning the differences between previous versions of the database and the current one, using hashes or checksums in order to validate the consistency of the information.

The amount of data can be reduced by expressing all coordinates as relative distances from a point of origin of the sub-region they refer to. The sub-region may be defined as the region transmitted by a specific satellite (and therefore implicit in the transmission channel) or may be further broken up into smaller sub-regions, in which case each position datum will refer to a father tree, each one defining a macro-region that becomes smaller and smaller moving down in the hierarchy.

In order to further reduce the amount of data, each NFZ area may be identified as a single point and a radius (thus determining a circular area), as an aggregation of circular areas, or as a polygon (or spline), the first point of which is determined as coordinates relative to the sub-region and the next points are determined as coordinates relative to the point of origin, resulting in a smaller number of bits being required for expressing the coordinates. The NFZ area may also be identified as a geometric shape obtained by rotation of a plane geometric shape or as the union or intersection of multiple plane geometric shapes.

As an alternative, an NFZ stored in the NFZ database is identified as a three-dimensional volume, e.g. a parallelepipedon, a sphere, a straight circular cylinder, a straight elliptical cylinder, a truncated cone, a truncated elliptical cone, a solid obtained by rotation of three-dimensional shapes, or a solid obtained by mutual union or intersections of multiple solids.

The applicability of NFZ interdiction may be scaled according to the area, the type of UAV vehicle, and the mission it has to carry out. As a consequence, it is conceivable that each NFZ has one or more attributes representing the level of severity of flight interdiction for the UAV vehicle (e.g. "forbidden", "subject to authorization", "potential risk warning", "free flight"), possibly correlated to its class/category (e.g. "privately built"; C0; C1; C2" classes or "open sub A1/A2/A3; specific" categories, as defined in the Opinion 01/2018 of the European Aviation Safety Agency, also known as EASA). For the purpose of obtaining a more robust and secure transmission of such information, the data may also be encrypted by means of a public key, so that it will be impossible to inject wrong data, generated by an ill-intentioned person, into UAVs implementing the present invention.

The received data can thus be used by the existing flight controller in order to determine if the current position falls within the NFZs defined in the database, in which case the flight controller will refuse to take off or, alternatively, if the position is already close to the NFZ, it will either refuse to continue the trip or carry out a user-programmed procedure, e.g. return to the base or land. The proposed solution allows for real-time updating, without requiring Internet connectivity, the NFZ database that must be stuck to by UAV vehicles.

In addition to using the existing GNSS infrastructure and the hardware already present in many UAV vehicles, the transmission system proposed herein also allows eliminating, through a firmware update, the possibility that a pilot might inadvertently fly his own UAV into forbidden zones.

The presence of an incremental update method allows reducing the database download time and pre-loading the updated database into the UAV vehicle, which will nevertheless be validated, by means of a hash system, against the one transmitted by the satellite infrastructure.

While the present invention has been described herein with reference to particular embodiments thereof, it must be underlined that the present invention is not limited to the particular embodiments described and represented in the drawings, since the present invention comprises also any other variants and/or modifications of the embodiments described herein and represented in the drawings which still fall within the scope of the claims.

The invention claimed is:

1. A method of distribution or update of a No Fly Zones (NFZ) database stored aboard UAV vehicles, the method comprising:
   utilizing a satellite infrastructure and receivers installed aboard said UAV vehicles in order to establish a one-way communication channel with said UAV vehicles; and
   periodically sending to said UAV vehicles, through said one-way communication channel, data of said NFZ database, or a portion thereof, to update said NFZ database stored aboard said UAV vehicles,
   wherein said satellite infrastructure comprises GNSS satellites, said receivers on said UAV vehicles comprise GNSS receivers, and said communication channel utilizes the GNSS satellite infrastructure to periodically send said data of said NFZ database, or a portion thereof, to said UAV vehicles,
   wherein said communication channel is established by modulating said data of said NFZ database onto a signal that is carrying positioning data of said GNSS satellite infrastructure to said UAV vehicles to thereby generate a modulated signal, the modulated signal including a positioning data portion and a data of said NFZ database portion.

2. The method according to claim 1, wherein said GNSS satellite infrastructure is complemented with an SBAS satellite communication system that comprises SBAS satellites, wherein signals of satellites of said SBAS satellite communication system use a reserved identifier SV ID not used by said GNSS satellites of said GNSS satellite infrastructure that transmit said positioning data, in order to send said data of said NFZ database, or a portion thereof, to said UAV vehicles.

3. The method according to claim 1, wherein said GNSS satellite infrastructure is complemented with a satellite communications system that comprises one or more telecommunications satellites transmitting in accordance with a protocol which complies with said GNSS satellite infrastructures, and which can therefore be demodulated by said GNSS receivers aboard said UAV vehicles, wherein said one or more telecommunications satellites are used in order to send said data of said NFZ database, or a portion thereof, to said UAV vehicles by exploiting all the available channel.

4. The method according to claim 1, wherein said GNSS satellite infrastructure is complemented with a satellite communications system that comprises one or more telecommunications satellites transmitting in accordance with a protocol which complies with said GNSS satellite infrastructures, and which can therefore be demodulated by said GNSS receivers aboard said UAV vehicles, wherein said one or more telecommunications satellites are used in order to send said data of said NFZ database, or a portion thereof, to said UAV vehicles while sharing a channel with other data.

5. The method according to claim 1, wherein said NFZ database is subject to incremental updates based on hash methods that provide, in parallel with the slow transmission of a complete NFZ database, and with a higher frequency, the sending of data packets only concerning the differences between previous versions of the NFZ database and the current one, wherein said hash methods are used in order to validate the consistency of the information.

6. The method according to claim 1, wherein said NFZ database is divided into regions compatible with the coverage provided by satellite communications systems, and the regions may in turn be divided into sub-regions in order to break up the transport of said data into smaller blocks of the entire region.

7. The method according to claim 6, wherein said receivers aboard said UAV vehicles receive and manage only that portion of the database which covers those NFZs that are present in the area where said UAV vehicles are located.

8. The method according to claim 1, wherein the information contained in said NFZ database is stored in such a way that all coordinates are expressed as relative distances from a point of origin, and wherein said point of origin is not fixed throughout the database, but may vary depending on which sub-region the coordinates belong to.

9. The method according to claim 8, wherein the information contained in said NFZ database is stored in such a way that each NFZ area is identified as a single point and a radius, thus determining a circular area.

10. The method according to claim 8, wherein each NFZ area stored in said NFZ database is identified as an aggregation of circular areas, or spline areas, or as a polygon, wherein the first point is determined as coordinates relative to the sub-region and the next points are determined as coordinates relative to the point of origin.

11. The method according to claim 8, wherein each NFZ area stored in said NFZ database is identified as a geometric shape obtained by rotation of a plane geometric shape or as the union or intersection of multiple plane geometric shapes.

12. The method according to claim 8, wherein an NFZ stored in the NFZ database is identified as a three-dimensional volume, in particular a straight circular cylinder, a straight elliptical cylinder, a truncated cone, a truncated elliptical cone, a solid obtained by rotation of three-dimensional shapes, or a solid obtained by mutual union or intersections of multiple solids.

13. The method according to claim 8, wherein each NFZ has one or more attributes representing the severity level of the flight interdiction for said UAV vehicle, said severity level being possibly correlated to the class/category of said UAV vehicle.

14. The method according to claim 1, wherein said data of said NFZ database is encrypted by means of a public key.

15. The method according to claim 1, wherein said modulated signal is generated at a base station and transmitted from said base station to said GNNS satellite infrastructure and from said GNNS satellite infrastructure to said NFZ database.

16. A vehicle, in particular a UAV vehicle, comprising a receiver (RX) for receiving signals sent in accordance with the method of claim 1.

17. A method of distribution or update of a No Fly Zones (NFZ) database stored aboard UAV vehicles, the method comprising:
utilizing a satellite infrastructure and receivers installed aboard said UAV vehicles in order to establish a one-way communication channel with said UAV vehicles; and
periodically sending to said UAV vehicles, through said one-way communication channel, data of said NFZ database, or a portion thereof, to update said NFZ database stored aboard said UAV vehicles,
wherein said satellite infrastructure comprises SBAS satellites, said receivers on said UAV vehicles comprise SBAS receivers, and said communication channel utilizes the SBAS satellite infrastructure to periodically send said data of said NFZ database, or a portion thereof, to said UAV vehicles,
wherein said communication channel is established by modulating said data of said NFZ database onto a signal that is carrying positioning data of said SBAS satellite infrastructure to said UAV vehicles to thereby generate a modulated signal, the modulated signal including a positioning data portion and a data of said NFZ database portion.

* * * * *